Dec. 30, 1969     T. E. GREGO     3,486,588
MULTIPLE DISC BRAKE WITH RESILIENT RELEASE MEANS
Filed Feb. 5, 1968     2 Sheets-Sheet 1

INVENTOR
THOMAS E. GREGO
ATTORNEY

Dec. 30, 1969    T. E. GREGO    3,486,588
MULTIPLE DISC BRAKE WITH RESILIENT RELEASE MEANS
Filed Feb. 5, 1968    2 Sheets-Sheet 2

INVENTOR
THOMAS E. GREGO
Robert R. Paquin
ATTORNEY

United States Patent Office 3,486,588
Patented Dec. 30, 1969

1

3,486,588
MULTIPLE DISC BRAKE WITH RESILIENT RELEASE MEANS
Thomas E. Grego, Waverly, N.Y., assignor to Ingersoll-Rand Company, New York, N.Y., a corporation of New Jersey
Filed Feb. 5, 1968, Ser. No. 703,138
Int. Cl. F16d 55/38, 65/18
U.S. Cl. 188—72   3 Claims

ABSTRACT OF THE DISCLOSURE

A lift hoist provided with a multiple disc brake comprising fixed and rotatable discs, alternately arranged to form a brake or disc stack, which include braking surfaces frictionally engagable upon compression of the brake stack. The brake stack is compressed by a cam operated actuating element, and includes a plurality of resilient rings of rubberlike material which cushion the engagement of the braking surfaces and facilitate separation of the latter during expansion of the brake stack.

BACKGROUND OF THE INVENTION

The present invention relates to brakes and more particularly to multiple disc brakes. Conventionally, multiple disc brakes have been employed in numerous applications including, by way of specific example, lift hoists. However, conventional disc brakes, when employed in a lift hoist or the like, have been found to be subject to certain deficiencies and disadvantages. For example, problems have been encountered in preventing an overtight or locked brake and in providing for smooth braking action when the hoist is lowering a load. In addition, during the lowering of a load by a hoist, disc brakes applied by a cam operated actuating element have suffered from brake chatter caused by fluctuating pressures applied to the brake stack by the operating cams.

SUMMARY OF THE INVENTION

An object of the present invention is to provide a new and improved multiple disc brake which is particularly constructed and arranged such that, when applied to a hoist or the like, it overcomes these deficiencies and disadvantages of conventional disc brakes.

Another object of the invention is to provide a new and improved multiple disc brake of the type set forth which, although particularly suited for application with a hoist or the like, is capable of employment in many other brake applications.

These objects, and those other objects and advantages of the invention which will be apparent from the following description taken in connection with the accompanying drawings, are in general attained by the provision of a multiple disc brake comprising first disc means fixed against rotation, and second disc means mounted for rotation. The first and second disc means are arranged side-by-side to form a brake or disc stack and have braking surfaces frictionally engageable upon compression of the brake stack to cause the first disc means to hold the second disc means against rotation. This disc brake, moreover, includes an actuating means movable between a first position wherein it causes compression of the brake stack and a second position wherein it releases the brake stack to permit expansion of the latter, and ring means of rubberlike material interposed in the brake stack for cushioning the engagement of the braking surfaces upon compression of the brake stack and facilitating separation of the braking surfaces upon release of the brake stack.

BRIEF DESCRIPTION OF THE DRAWINGS

Referring to the drawings.

DESCRIPTION OF THE PREFERRED EMBODIMENT

Figures 1, 4:
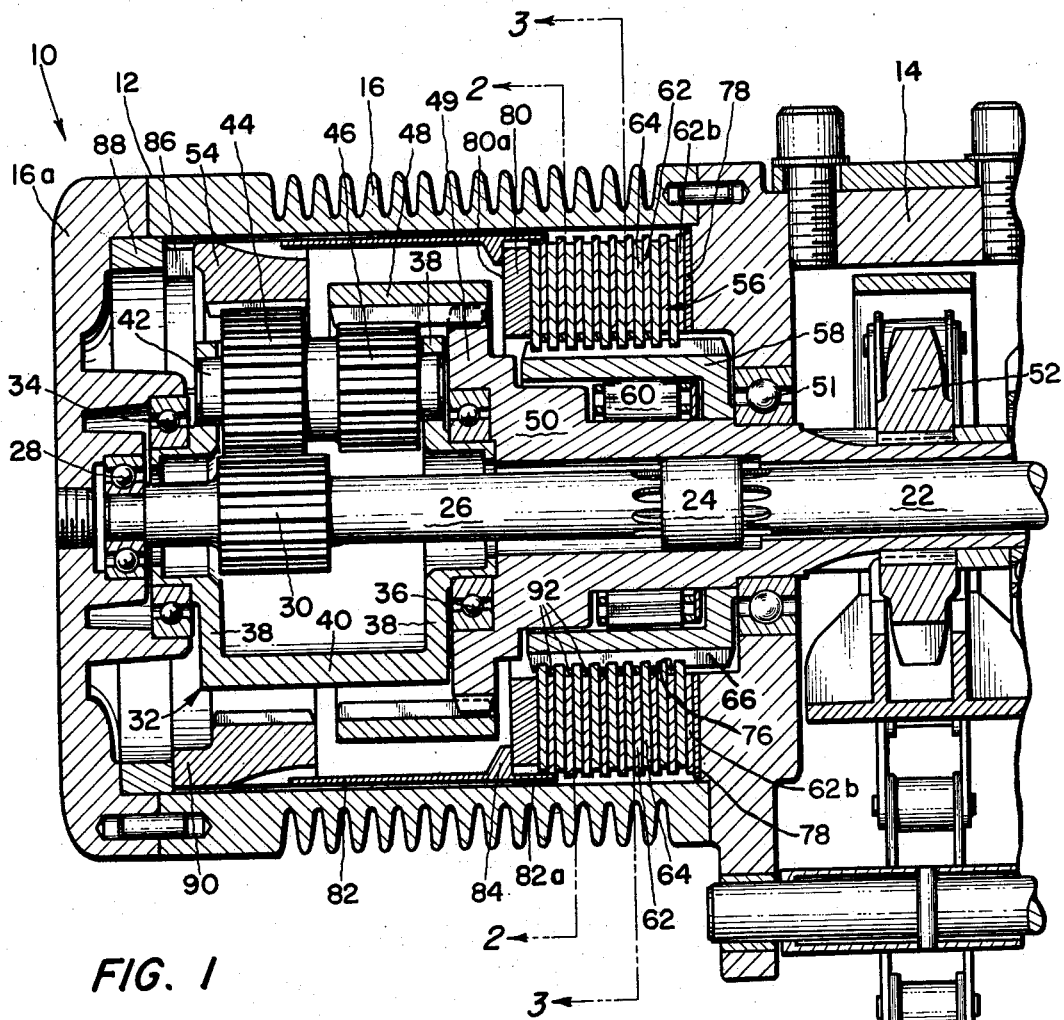
FIG. 1 is a fragmentary, elevational sectional view of a lift hoist which is provided with an embodiment of the multiple disc brake of the present invention.
FIG. 4 is an exploded view showing a portion of the disc brake on the hoist illustrated in FIGS. 1 through 3.

Referring more particularly to the drawings wherein similar reference characters designate corresponding parts throughout the several views, FIG. 1 fragmentarily illustrates a lift hoist designated generally as 10 which is provided with a multiple disc brake constructed in accordance with the present invention. The disc brake, as will be understood, has been shown, and will be hereinafter described, in conjunction with a lift hoist for the purposes of illustration only and may, alternatively, be employed in other applications in which a braking action is desired.

The hoist 10, per se, is substantially similar to that disclosed in U.S. patent application Ser. No. 520,144 filed Jan. 12, 1966 by Emanuel G. Spyridakis, now U.S. Patent No. 3,370,832, and assigned to the assignee of the present invention. The hoist 10 comprises a housing designated generally as 12 which is formed to include a sprocket casing 14, a gear casing 16 at one end of the sprocket casing 14, and a motor casing (not shown) containing a motor (not shown) and at the other end of the sprocket casing 14. The hoist 10, as will be understood, is adapted to be suspended from an overhead support by conventional mounting means, such as a mounting hook (not shown), and includes a depending hoist chain 18 which extends through an opening in the sprocket casing 14 and at its lower end carries a lift hook 20.

The aforesaid motor of the hoist 10 rotatably drives a motor drive shaft 22 which is connected through an internally splined sleeve 24 to one end of an aligned, input drive shaft 26 whereby its rotation provides conjoined rotation of the drive shaft 26. The drive shaft 26 intermediate its ends includes an integral sun gear or pinion 30, and at its opposing end is rotatably mounted by ball bearings 28 which are carried by the end plate 16a of the gear casing 16.

A planetary gear frame 32 is positioned circumferentially around the drive shaft 26 and rotatably mounted adjacent its opposing ends by ball bearings 34, 36. The gear frame 32 is formed by a pair of spaced, end hubs 38 interconnected through three integral struts 40, and rotatably carries three stub shafts 42 which are supported at their opposing ends by the end hubs 38. The stub shafts 42 are spaced around the drive shaft 26 at equal radial distances from the latter and at an angular spacing of 120 degrees from one another. The stub shafts 42 each carry large and small planet gears which are designated as 44 and 46, respectively. The large planet gears 44 intermesh with the sun gear 30 carried by the drive shaft 26; the small planet gears 46 intermesh with an output ring gear 48. The ring gear 48 also intermeshes with a driving gear 49 which is intergrally formed with an output shaft 50. The output shaft 50 is rotatably mounted by the ball bearings 36, 51 and extends into the sprocket casing 14 where it carries the hoist chain sprocket 52, in turn, carrying the hoist chain 18.

The large planet gears 44 intermesh with a large ring gear 54 which is mounted in the gear casing 16 for limited angular and lateral movement relative to the latter. The limited angular movement of the large ring gear 54 need only be a few degrees and, as disclosed in the aforementioned application Ser. No. 520,144, could be obtained by mounting the large ring gear 54 on fixed supporting rods extending through oversize openings or notches somewhat larger than the rods. Alternatively, however, it will be understood that the large ring gear 54 could be otherwise mounted in a conventional manner suitable to provide the aforesaid limited movement.

From the preceding description it will be seen that, during the rotation of the drive shaft 26 by the motor drive shaft 22, the sun gear 30 drives the large planet gears 44 which, due to their engagement with the substantially stationary large ring gear 54, cause the gear frame 32 to rotate in the same rotary direction as the sun gear 30. Due to the differential ratio between the planet gears 44, 46 and their intermeshing ring gears 54, 48, moreover, the small planet gears 46 drive the output ring gear 48 in the same rotary direction as, but at a slower speed than, the gear frame 32. The output ring gear 48, in turn, rotatably drives the output shaft 50 and its carried chain sprocket 52 to provide resultant adjustment in the effective length of the hoist chain 18.

The embodiment of the multiple disc brake on the hoist 10 is designated generally as 56 and comprises a rotatable, annular brake sleeve or support 58 which is positioned circumferentially around the output shaft 50 for rotation thereto. A conventional, one-way spray clutch 60 is interposed intermediate the output shaft 50 and the support 58. The clutch 60 is arranged to lock the support 58 to the output shaft 50 when the latter is rotating in a direction to lower a load carried by the lift hook 20 and to release the support 58 when the output shaft 50 is rotating to raise such a load.

The multiple disc brake 56 also includes fixed and rotatable brake discs 62, 64, respectively, which are positioned circumferentially around the support 58 and alternately arranged in side-by-side relationship to form a brake or disc stack. More specifically, the outer circumference of the support 58 is provided with axially extending, straight splines 66. A plurality of spaced, rotatable brake discs 64 are arranged circumferentially around the support 58 and connected to the latter by the splines 66 for conjoined rotation with, and movement axially on, the support 58. The rotatable brake discs 64, as illustrated in FIG. 4 wherein one has been shown for the purposes of illustration, are each formed of generally ring configuration and on their inner circumferences include splines 68 adapted for interengagement with the splines 66 to provide the aforesaid rotatable keying, but relative axial movement, of the rotatable brake discs 64 and the support 58. The side faces 64a of the rotatable brake discs 64 are suitably formed to function as frictional braking surfaces and may be faced with a friction material such as conventionally employed on a brake shoe or a clutch face.

Figure 2:
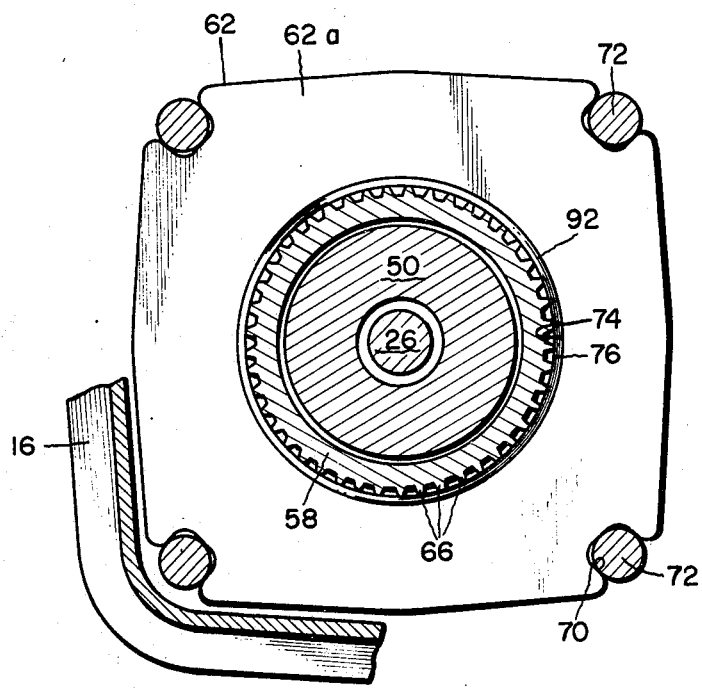
FIG. 2 is an elevational sectional view taken on line 2—2 of FIG. 1, looking in the direction of the arrows.
Figure 3:
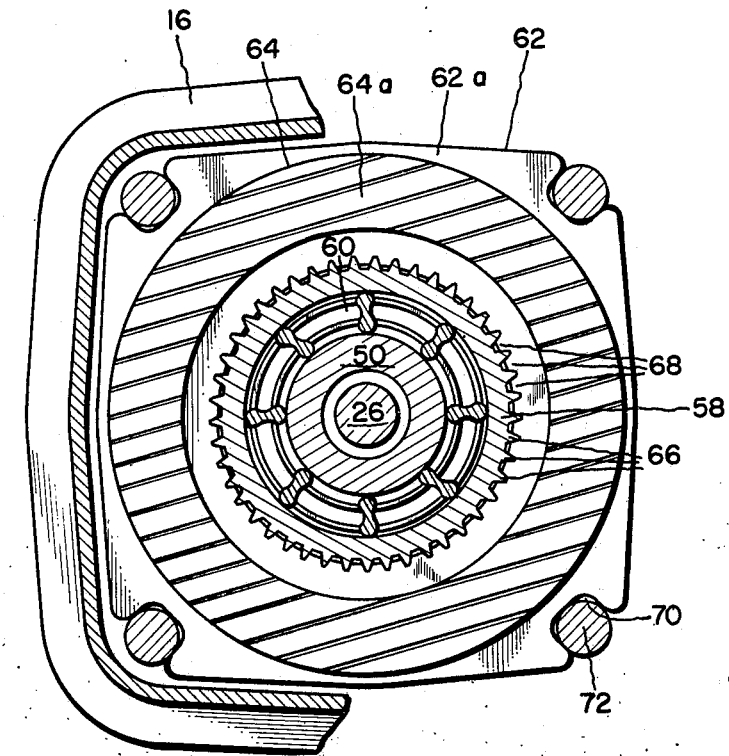
FIG. 3 is an elevational sectional view taken on line 3—3 of FIG. 1, looking in the direction of the arrows.

A plurality of fixed brake discs or plates 62 are also arranged circumferentially around the support 58 and positioned such that each (except the end fixed brake disc 62b) is intermediate adjacent ones of the rotatable brake discs 64. Thus, as aforementioned, the fixed and rotatable brake discs 62, 64 are alternately arranged in side-by-side or face-to-face relationship. The fixed brake dics 62, as illustrated in FIGS. 2–4, are formed of generally ring configuration and include cutouts or notches 70 at their periphery. The fixed brake discs are slidably supported by four supporting rods 72 and are fixed against rotation by the supporting rods 72 as the latter are fixedly, or nonrotatably, connected to the housing 12. As will be understood, these same supporting rods 72 could be employed to support the large ring gear 54 for its aforedescribed limited movement.

The inner peripheries 74 of the fixed brake discs 62 are suitably formed such that the latter are spaced from the outer circumference of the support 58 by a relatively narrow annular space or gap 76 and, hence, do not engage the support 58 as do the rotatable brake discs 64. The side faces 62a of the fixed brake discs 62 are suitably formed to function as frictional braking surfaces and may be faced with a friction material such as conventionally employed on a brake shoe or a clutch face.

From the foregoing description it will be seen that the brake stack of the multiple disc brake 56 includes alternately arranged, fixed and rotatable brake discs 62, 64, having side faces 62a, 64a, respectively, operable, when the brake stack is compressed to frictionally engage adjacent ones of the faces 62a, 64a, whereby the fixed brake discs 62 hold the rotatable brake discs 64 against rotation. This brake stack, as illustrated in FIG. 1, is arranged such that it is positioned between an annular disc seat 78 fixed to the housing 12 and an annular brake plate 80 which is mounted for slidable movement relative to the housing 12 and axially to the support 58.

The multiple disc brake 56, moreover, includes an actuating means which is movable between a first position wherein it causes compression of this brake stack (and resultant frictional engagement of adjacent side faces 62a, 64a) and a second position where it releases the brake stack to permit expansion of the brake stack (and resultant separation of adjacent side faces 62a, 64a). This actuating means, as illustrated in FIG. 1, comprises an annular, actuating element or sleeve 82 which is rigidly affixed to the large ring gear 54 for movement therewith. The actuating element 82 carries a shoulder rib 84 which is keyed to the side face 80a of the brake plate 80 whereby, upon lateral movement of the large ring gear 54 towards the brake plate 80, it causes the brake discs, 62, 64 to be clamped in tight face-to-face engagement to thereby compress the brake stack and, upon reverse lateral movement of the large ring gear 54, it releases the tight clamping of the brake stack to thereby permit separation of the side faces 62a, 64a of the brake discs 62, 64. The fixed brake disc 62 nearest to the brake plate 80 is keyed to the flange 82a of the actuating element 82.

A cam means is provided for operating the actuating element 82 to cause it to provide the aforedescribed compression of the brake stack. This cam means, as illustrated, is arranged to cam the large ring gear 54 and actuating element 82 laterally towards the brake plate 80 when the large ring gear 54 carries a rotary torque acting in a selected rotary direction. More particularly, the cam means comprises cam teeth 86 formed on an annular support 88 fixedly connected to the end plate 16a of the gear casing 16, and engaging cam teeth 90 provided on the large ring gear 54. The cam teeth 86, 90 are preferably each three in number and arranged at 120 degree intervals whereby the large ring gear 54 and actuating element 82 are provided with a balanced camming force. The illustrated cam teeth 86, 90, moreover, are constructed to cam the large ring gear 54 and actuating element 82 towards the brake plate 80 when the hoist 10 is either raising a load or supporting a load in a stationary position.

The present invention comprises the provision in the brake stack of resilient means for cushioning the engagement of the side faces 62a, 64a upon compression of the brake stack and facilitating separation of such faces upon the release of the brake stack. More particularly, as illustrated in FIG. 1, a ring element 92 is interposed in the annular space 76 bounded by each of the fixed brake discs 62 except the disc 62b and the disc 62 most thereadjacent. The ring elements 92 are each formed of a suitable resilient material such as rubber and are suitably formed such that, when in operative position encircling the outer circumference of the support 58, they tightly grip the support 58 for conjoined rotation therewith. The ring elements 92, moreover, when in such position engage the side faces 64a of the two rotatable brake discs 64 most adjacent to (i.e.: the rotatable brake discs 64 immediately adjacent opposing sides of) their respective encircling fixed brake discs 62. Thus, upon compression of the brake stack to cause frictional engagement between the side faces 62a, 62b of the discs 62, 64 the ring elements 92 cushion such engagement. Moreover, upon release of the brake stack the ring elements 92 facilitate the separation of the side faces 62a, 62b and ensure uniform separation of such faces. In addition, as will be seen, the ring elements 92 act through the actuating element 82 to maintain a constant biasing force or pressure on the cam means operating such actuating element 82 upon said release of the brake stack.

In the following description of the operation of the hoist 10 the terms clockwise and counterclockwise have been employed to designate relative rotary directions as viewed in FIGS. 2 and 3. It has also been assumed for the purposes of description that clockwise rotation of the output shaft 50 lowers the lift hook 20 and, conversely, that counterclockwise rotation of the output shaft 50 raises the lift hook 20. It will be understood, moreover, that the gear ratios of the hoist 10 are selected such that rotation of the planet gears 44, 46 provides greater relative rotation between the large ring gear 54 and the gear frame 32 than between the ring gear 48 and such gear frame 32. Hence, the ring gear 48 is driven slower than, and in the same rotary direction as, the gear frame 32.

In the operation of the hoist 10, with the lift hook 20 vertically stationary, a load thereon applies a torque on the output shaft 50 in the clockwise direction. This torque urges the planet gears 44, 46 in a clockwise direction and causes the planet gears 44 to apply a torque to the large ring gear 54 also in a clockwise direction. This latter torque on the large ring gear 54 causes the cam teeth 86, 90 to laterally urge the large ring gear 54 and actuating element 82 towards the brake plate 80. Simultaneously, the sprag clutch 60 locks the support 58 to the output shaft 50.

Thus, the actuating element 82 is moved to a position wherein it causes compression of the brake stack and resultant frictional engagement of the side faces 62a, 64a of the brake discs 62, 64, respectively. The resilient ring elements 92 cushion the initial compression shock imposed on the brake stack during this engagement of the side faces 62a, 64a, but allow the brake stack to be compressed the amount necessary for providing a safe smooth braking action. Hence, the output shaft 50 and sprocket 52 are locked by the multiple disc brake 56 against vertical movement.

To lower a load carried by the lift hook 20, the hoist motor is operated to rotate the drive shaft 26 and sun gear 30 in a clockwise direction. The sun gear, in response to this movement, rotates the planet gears 44, 46 in a counterclockwise direction whereby the interengagement of the planet gears 44 and large ring gear 54 rotatably drives the gear frame 32 in a clockwise direction and moves the large ring gear 54 in a counterclockwise direction to release the brake 56. More specifically, this counterclockwise rotation of the large ring gear 54 moves the latter and the actuating element 82 laterally towards the annular support 88, thereby causing the actuating means to release the brake stack and permit expansion of the latter. The ring elements 92 facilitate the separation of the side faces 62a, 62b permitted by this movement of the actuating element 82 and insure that the side faces 62a, 64 have equal separation. In addition, as will be seen, the ring elements 92 also act through the actuating element 82 to maintain a constant pressure on the cam teeth 86, 90 which prevents the cam teeth 86 from searching and thereby prevents brake chatter. As the hoist motor continues to rotate the drive shaft 26 to lower the lift hook 20 and its carried load. the load torque, of course, overruns the motor torque to cause the brake 56 to be alternately applied and released in the manner usual in hoist brakes.

With the hoist 10 operating to raise the lift hook 20 and its carried load, the hoist motor rotatably drives the drive shaft 26 and sun gear 30 in a counterclockwise direction. The sun gear 30, in turn, rotates the planet gears 44, 46 in a clockwise direction; and the reaction between the planet gears 44 rotates the gear frame 32 in a counterclockwise direction. Thus, the output shaft 50 is rotatably driven in a counterclockwise direction. The clutch 60, of course, releases the support 58 from the output shaft 50 during the counterclockwise rotation of the latter and thereby permits the output shaft 50 to drive the sprocket 52 in the counterclockwise direction to raise the lift hook 20 and its supported load.

From the aforegoing description it will be seen that I have provided a new and improved multiple disc brake which is particularly constructed and arranged for accomplishing all of the objects and advantages of my invention. It will, however, be understood that, although I have illustrated and described this disc brake with primary reference to a lift hoist, such has been done for the purposes of illustration only. It will, moreover, be understood that, although I have hereinbefore specifically described only one embodiment of the invention, the invention is not limited merely to this single embodiment but rather contemplates other embodiments and variations.

Having thus described my invention, I claim:

1. A multiple disc brake comprising a rotatable support, first disc means fixed against rotation encircling said support and spaced therefrom by a space around said support, second disc means encircling said support and mounted on said support for rotation therewith, said first and second disc means being arranged side-by-side to form a brake stack and having braking surfaces frictionally engageable upon compression of the brake stack to cause said first disc means to hold said second disc means against rotation, actuating means for alternatively causing compression and permitting expansion of the brake stack, and ring means constructed of rubberlike material in said space around said support and gripping said support for cushioning the engagement of said braking surfaces during compression of the brake stack and facilitating separation of said braking surfaces during expansion of the brake stack.

2. A multiple disc brake according to claim 1, wherein said first disc means comprises a generally annular fixed brake disc, said second disc means comprises a pair of generally annular rotatable brake discs arranged on opposing sides of said fixed brake disc, and said ring means comprises a ring shaped resilient element engaging said rotatable brake discs.

3. A multiple disc brake comprising a rotatable support, a plurality of brake discs fixed against rotation encircling said support and spaced therefrom by a space around said support, a plurlity of brake discs encircling said support and mounted on said support for rotation therewith, said fixed and rotatable brake discs being alternately arranged side-by-side to form a brake stack and having braking surfaces frictionally engageable upon compression of the brake stack to cause said fixed brake discs to hold said rotatable brake discs against rotation, actuating means movable for alternatively causing compression and permitting expansion of the brake stack, cam means operable for moving said actuating means to cause compression of the brake stack, and a plurality of ring shaped resilient elements constructed of rubberlike material, said resilient elements each being in one of said spaces around said support and gripping said support, said resilient elements each engaging the rotatable brake discs on opposing sides of their surrounding fixed brake disc for cushioning the engagement of said braking surfaces during compression of the brake stack and facilitating separation of the braking surfaces during expansion of the brake stack, and said resilient elements being operable to act through said actuating element to maintain a constant pressure on said cam means.

References Cited

UNITED STATES PATENTS

| | | | |
|---|---|---|---|
| 1,566,569 | 12/1925 | Anderson | 188—72 |
| 2,174,395 | 9/1939 | Aikman | 188—72 |
| 2,217,357 | 10/1940 | Coe | 192—70.58 |
| 3,171,522 | 3/1965 | Petrie et al. | 188—72 X |

GEORGE E. A. HALVOSA, Primary Examiner

U.S. Cl. X.R.

188—1, 216; 192—70.28